United States Patent
Wada

(10) Patent No.: US 8,310,592 B2
(45) Date of Patent: Nov. 13, 2012

(54) SIGNAL PROCESSING APPARATUS, SIGNAL PROCESSING METHOD, AND PROGRAM FOR SIGNAL PROCESSING

(75) Inventor: Noriaki Wada, Hyogo (JP)

(73) Assignee: Panasonic Corporation, Osaka (JP)

( * ) Notice: Subject to any disclaimer, the term of this patent is extended or adjusted under 35 U.S.C. 154(b) by 422 days.

(21) Appl. No.: 12/575,251

(22) Filed: Oct. 7, 2009

(65) Prior Publication Data

US 2010/0123824 A1     May 20, 2010

(30) Foreign Application Priority Data

Oct. 10, 2008   (JP) ................. 2008-263821

(51) Int. Cl.
  *H04N 7/01* (2006.01)
  *H04N 11/20* (2006.01)
  *H04N 9/74* (2006.01)
  *H04N 5/00* (2011.01)
  *H04N 5/21* (2006.01)
  *G06K 9/48* (2006.01)
  *G06K 9/40* (2006.01)
  *G06K 9/32* (2006.01)

(52) U.S. Cl. ........ 348/448; 348/607; 348/625; 348/458; 348/581; 382/199; 382/266; 382/298

(58) Field of Classification Search .......... 348/441, 348/445, 448, 452, 458, 538, 581, 607, 625; 345/660; 382/199, 266, 298–300
See application file for complete search history.

(56) References Cited

U.S. PATENT DOCUMENTS

| | | | | |
|---|---|---|---|---|
| 5,177,610 A | * | 1/1993 | Wilkinson | 348/452 |
| 5,257,102 A | * | 10/1993 | Wilkinson | 348/441 |
| 5,280,351 A | * | 1/1994 | Wilkinson | 348/448 |
| 5,715,000 A | * | 2/1998 | Inamori | 348/241 |
| 5,754,710 A | | 5/1998 | Sekine et al. | |
| 5,929,918 A | * | 7/1999 | Pereira et al. | 348/448 |
| 5,946,044 A | * | 8/1999 | Kondo et al. | 348/458 |
| 6,577,345 B1 | * | 6/2003 | Lim et al. | 348/452 |
| 6,618,443 B1 | * | 9/2003 | Kim et al. | 375/240.21 |
| 7,054,507 B1 | * | 5/2006 | Bradley et al. | 382/300 |
| 7,099,509 B2 | * | 8/2006 | Wang et al. | 382/199 |
| 7,324,709 B1 | * | 1/2008 | Wang et al. | 382/300 |

(Continued)

FOREIGN PATENT DOCUMENTS

JP    7-50752    2/1995

(Continued)

*Primary Examiner* — Brian Yenke
(74) *Attorney, Agent, or Firm* — Wenderoth, Lind & Ponack, L.L.P.

(57) ABSTRACT

A signal processing circuit includes an interpolation filter for outputting an interpolation value of signal levels at positions of ¼ phase and ¾ phase between two original pixels of the input digital image adjacent in the predetermine direction; a phase shift circuit for outputting signal value of each of the two original pixels by shifting the phases of the signals of the two original pixels in the predetermined direction to ¼ phase and ¾ phase, respectively, between the two original pixels; a edge detection circuit for detecting a edge portion of the image from a signal level change of a plurality of pixels including the two original pixels of the input digital image in the predetermined direction; and a first signal selection circuit for outputting the output of the phase shift circuit when the edge is detected, and outputting the output of the interpolation filter when no edge is detected, based on the result of detection by the edge detection circuit.

14 Claims, 11 Drawing Sheets

U.S. PATENT DOCUMENTS

| | | | |
|---|---|---|---|
| 7,379,626 B2* | 5/2008 | Lachine et al. | 382/300 |
| 7,406,208 B2* | 7/2008 | Chiang | 382/266 |
| 7,515,209 B2* | 4/2009 | Hsu | 348/606 |
| 7,782,401 B1* | 8/2010 | Chou | 348/581 |
| 7,796,191 B1* | 9/2010 | Vojkovich | 348/448 |
| 7,945,121 B2* | 5/2011 | Wei et al. | 382/300 |
| 8,081,256 B2* | 12/2011 | Lertrattanapanich et al. | 348/448 |
| 8,098,331 B2* | 1/2012 | Miyazawa | 348/584 |
| 8,098,334 B2* | 1/2012 | Huang et al. | 348/625 |
| 2004/0252232 A1* | 12/2004 | Lodder et al. | 348/448 |
| 2005/0008251 A1* | 1/2005 | Chiang | 382/266 |
| 2006/0039590 A1* | 2/2006 | Lachine et al. | 382/128 |
| 2007/0103587 A1* | 5/2007 | MacInnis et al. | 348/448 |
| 2009/0262247 A1* | 10/2009 | Huang et al. | 348/625 |
| 2009/0324136 A1* | 12/2009 | Yamada et al. | 382/300 |
| 2010/0135588 A1* | 6/2010 | Au et al. | 382/243 |
| 2010/0156772 A1* | 6/2010 | Arashima et al. | 345/87 |
| 2010/0157147 A1* | 6/2010 | Bellers | 348/448 |
| 2010/0165204 A1* | 7/2010 | Huang et al. | 348/581 |
| 2011/0081094 A1* | 4/2011 | Damkat | 382/254 |

FOREIGN PATENT DOCUMENTS

| | | |
|---|---|---|
| JP | 11-203467 | 7/1999 |
| JP | 2005-354161 | 12/2005 |
| JP | 2008-236522 | 10/2008 |

* cited by examiner

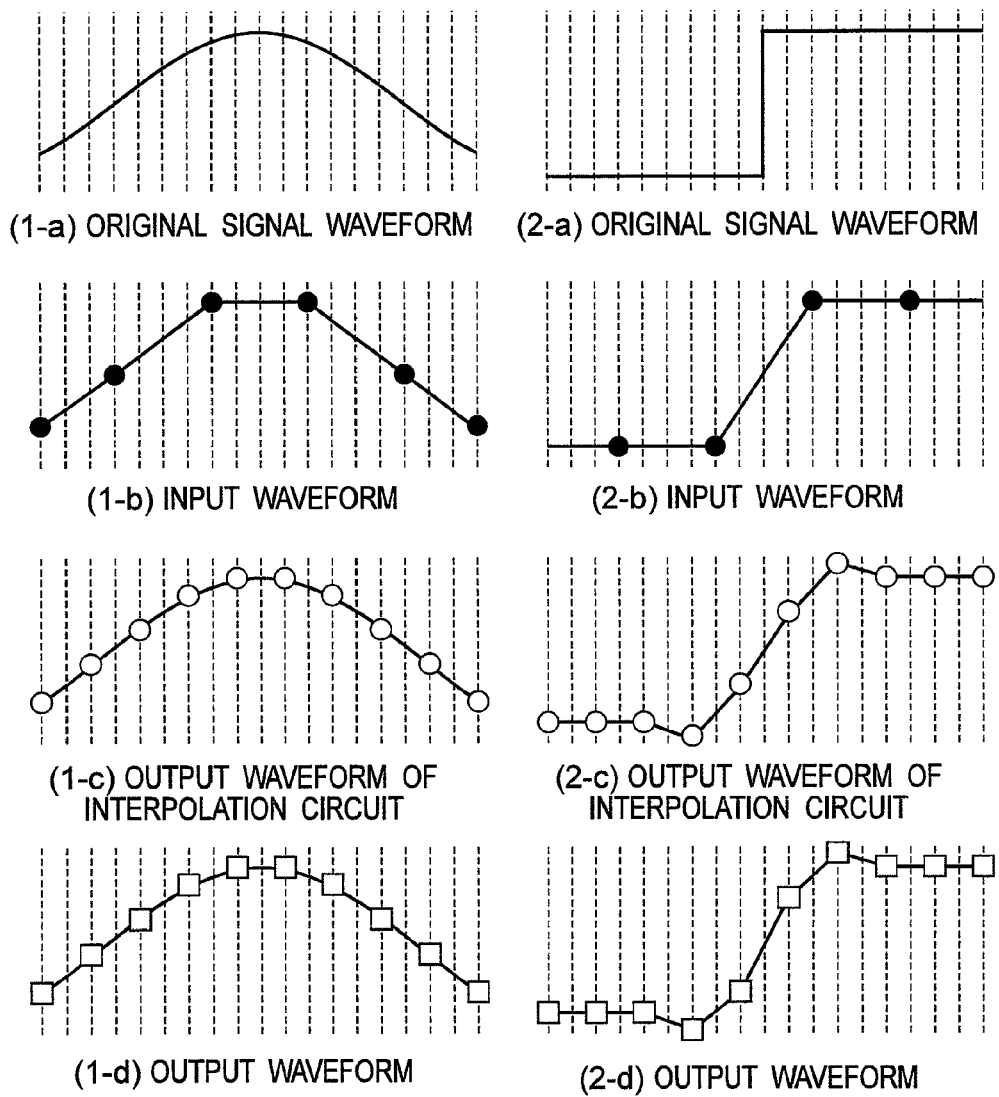

US 8,310,592 B2

SIGNAL PROCESSING APPARATUS, SIGNAL PROCESSING METHOD, AND PROGRAM FOR SIGNAL PROCESSING

BACKGROUND ART

1. Technical Field

The technical field relates to a signal processing apparatus, a signal processing method, and a signal processing program for converting an original image to an image having a larger number of pixels.

2. Related Art

In a conventional up-converting technique for converting an original image to an image of a higher definition, i.e. an image having a larger number of pixels, the number of pixels is increased by interpolating the pixels of the original image thus generating new pixels. In the process, various signal processing operations such as an edge-enhancement process are performed to improve the sharpness of the image. A signal processing apparatus of this type is described in, for example, JP-A-2005-354161. FIG. 13 is a block diagram showing a configuration of a conventional signal processing apparatus described in JP-A-2005-354161. With reference to FIG. 13, the interpolation process for the conventional up-converting method is described below. Although an example of the pixel interpolation in a vertical direction is illustrated in JP-A-2005-354161, the description is given of the interpolation process in a horizontal direction for convenience sake.

An image signal sampled is input to an input terminal of an interpolation circuit 80. The interpolation circuit 80 calculates and sequentially outputs interpolation values at positions of ¼ phase and ¾ phase between two pixels sampled. In this way, the number of pixels of an input image is doubled.

An output signal of the interpolation circuit 80 is delayed in each of delay circuits 81 and 82 by the sampling period of the double pixels, i.e. a half time of the sampling period of the original pixel input to the interpolation circuit 80. The input and output of the delay circuit 81 and the output of the delay circuit 82 are multiplied by coefficients −¼, ½ and −¼ in coefficient circuits 83, 84 and 85, respectively. The outputs of the coefficient circuits 83, 84 and 85 are added by an add circuit 86. The delay circuits 81 and 82, the coefficient circuits 83, 84 and 85 and the add circuit 86 compose a high-pass filter to enhance the edge.

A maximum value detection circuit 88 and a minimum value detection circuit 89 detect the input and the output of the delay circuit 81 and the output of the delay circuit 82, i.e. the maximum and minimum values of three successive pixels. The output of the add circuit 87 is output through a control circuit 90. The control circuit 90 clips the output of the add circuit 87 to cause it not to exceed the maximum value of the maximum value detection circuit 88 and not to decrease below the minimum value of the minimum value detection circuit 89.

FIG. 14 is a diagram showing an example of a waveform in each part of the signal processing apparatus shown in FIG. 13. In FIGS. 14(1-*a*) to 14(2-*d*), the abscissa represents the horizontal position of an input image, with the interval of dashed lines being ¼ pixel. The ordinate represents the signal level of the pixels, which is normalized in the range of 0 to 1. The pixel values of the input image are input to the signal processing apparatus in the order of raster scan for each sampling period, and therefore, the abscissa may be regarded to represent the signal input/output timing for the signal processing apparatus. In this case, the interval of the vertical dashed lines is ¼ of the sampling period.

First, a description is given to a case in which the original signal waveform is a part of a sinusoidal waveform as shown in FIG. 14(1-*a*). The input waveform to the signal processing apparatus is obtained by sampling the original signal waveform. This input waveform is shown in FIG. 14(1-*b*). In this case, the output of the interpolation circuit 80 has a waveform as shown in FIG. 14(1-*c*). Next, the output of the add circuit 87 which adds the original value to the output of the high-pass filter including the delay circuits 81 and 82, the coefficient circuits 83, 84 and 85 and the add circuit 86 to enhance the edge, is clipped by the control circuit 90 not to be a larger value than the output of the interpolation circuit 80. The inclined portion of the sinusoidal wave, though not clipped by the control circuit 90, has only a small high-frequency component. As a result, the final output waveform shown in FIG. 14(1-*d*) is substantially equal to the output waveform of the interpolation circuit 80 shown in FIG. 14(1-*c*).

Next, a description is given to a case in which the original signal waveform is a step waveform as shown in FIG. 14(2-*a*). The signal which is input to the signal processing apparatus has a waveform as shown in FIG. 14(2-*b*). In this case, the output of the interpolation circuit 80 has a waveform as shown in FIG. 14(2-*c*). Next, the output of the add circuit 87 which adds the original value to the output of the high-pass filter including the delay circuits 81 and 82, the coefficient circuits 83, 84 and 85 and the add circuit 86 to enhance the edge, has a value smaller than 0 or larger than 1. In other words, an overshoot occurs. However the signal is clipped by the control circuit 90 and thus the overshoot is reduced, as a result, the final output waveform is the shape as shown in FIG. 14(2-*d*).

In this case, the rise of the output waveform (FIG. 14(2-*d*)) with the step waveform input to the signal processing apparatus is steeper than in the case where only the interpolation process is executed by the interpolation circuit 80 (FIG. 14(2-*c*)) only. As a result, the edge portion is enhanced.

As described above, in the conventional signal processing apparatus shown in FIG. 13, the use of the high-pass filter causes the rise of the step waveform to be sharp and the waveform distortion to be reduced like the overshoot by the clip process for limiting the maximum and minimum values.

In the conventional configuration, however, the up-converted signal contains an overshoot component. Also, the problem is posed that the edge enhancement effect to steepen the rise portion of the step waveform is small.

SUMMARY

In view of the problem described above, an object of the present invention is to provide a signal processing apparatus, a signal processing method, and a signal processing program capable of causing no overshoot to occur in the edge portion of an image having a step waveform upon up-conversion to improve sharpness.

To achieve the above object, a first aspect provides a signal processing apparatus for doubling the number of effective pixels of an input digital image in a predetermined direction. The signal processing apparatus includes: an interpolation filter for outputting an interpolation value of signal levels at positions of ¼ phase and ¾ phase between two original pixels of the input digital image adjacent in the predetermine direction; a phase shift circuit for outputting signal value of each of the two original pixels by shifting the phases of the signals of the two original pixels in the predetermined direction to ¼ phase and ¾ phase, respectively, between the two original pixels; a edge detection circuit for detecting a edge portion of the image from a signal level change of a plurality of pixels including the two original pixels of the input digital image in the predetermined direction; and a first signal selection circuit for outputting the output of the phase shift circuit when the edge is detected, and outputting the output of the interpolation filter when no edge is detected, based on the result of detection by the edge detection circuit.

A second aspect provides a signal processing method for doubling the number of effective pixels in a predetermined direction of an input digital image. The signal processing method includes: an interpolation step for outputting an interpolation value of signal levels at the positions of ¼ phase and ¾ phase between two original pixels of the input digital image adjacent in a predetermined direction; a phase shift step for outputting signal value of each of the two original pixels by shifting the phases of the signals of the two original pixels in the predetermined direction to ¼ phase and ¾ phase, respectively, between the two original pixels; a edge detection step for detecting a edge portion of the image from a signal level change of a plurality of pixels including the two original pixels of the input digital image in the predetermined direction; and a first signal selection step for outputting the output of the phase shift step when the edge is detected, and outputting the output of the interpolation step when no edge is detected, based on the result of detection by the edge detection step.

Also, the function similar to that of the signal processing apparatus described above may be realized by a computer and a program.

In this aspect, the absolute value of the gradient of the signal change can be increased by shifting the phase of the signal for the edge portion upon up-conversion. As a result, the signal change for the edge portion is steepened, and the apparent resolution of the up-converted signal can be improved over the related art. Also, since no high-frequency filter is used for the phase shifting process to steepen the signal change, the waveform distortion which otherwise might be caused by the overshoot is advantageously avoided.

BRIEF DESCRIPTION OF DRAWINGS

FIG. 14 is a waveform diagram of the conventional signal processing apparatus.

DETAIL DESCRIPTION OF PREFERRED EMBODIMENT

Embodiments of the present invention are described below with reference to the drawings.

The signal processing apparatus according to the embodiments described below detects the edge portion of the image in which the signal level between pixels steeply changes upon up-conversion, and shifts the phases of the two pixels such that the two pixels approach each other while leaving the signal level of the two pixels composing the edge portion as it is. As a result, the waveform distortion due to the overshoot is prevented while making it possible to increase the change in the edge portion, so that a high-definition image can be realized.

First Embodiment

1. Configuration

Figure 1:
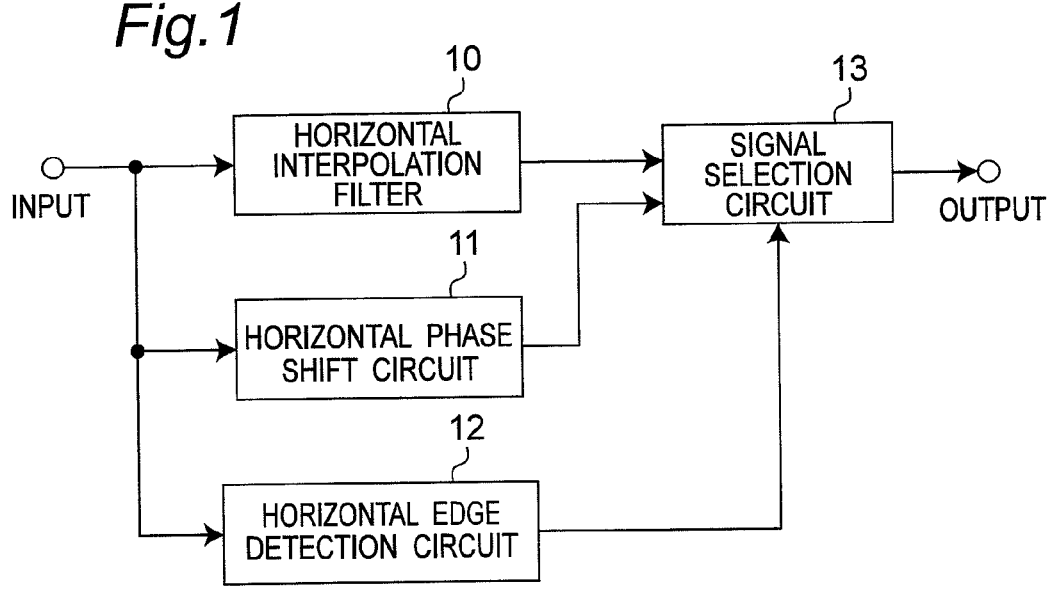
FIG. 1 is a block diagram showing a signal processing apparatus according to a first embodiment.

FIG. 1 is a block diagram showing a configuration of a signal processing apparatus according to a first embodiment. According to this embodiment, the signal processing apparatus is described, which doubles the number of pixels in a horizontal direction of an input image. This signal processing apparatus includes a horizontal interpolation filter 10, a horizontal phase shift circuit 11, a horizontal edge detection circuit 12 and a signal selection circuit 13. The pixel value of each of pixels composing the image to be converted is input from the input terminal in the order of raster scan at intervals of a predetermined sampling period. Specifically, the pixels are input in such a manner that the lines composing the image are scanned downward from the top and from left to right. In the following description, it is assumed that an input image having 720 effective pixels in the horizontal direction for a total of 858 pixels including the horizontal blanking part and 480 effective lines in the vertical direction for a total of 525 lines including the vertical blanking part is progressively scanned by an image signal at a vertical frequency of 60 Hz. A sampling period is 1/(858×525×60)≅37.0 ns.

The horizontal interpolation filter 10 calculates, by filtering, the interpolation value at positions of ¼ phase and ¾ phase between two successive input pixels (two horizontally adjacent pixels), which are compressed temporally and output alternately. The horizontal phase shift circuit 11 moves the phases of the horizontally adjacent two input pixels to the time points (in the horizontal direction) corresponding to ¼ phase and ¾ phase between the two pixels and outputs them. The horizontal edge detection circuit 12 monitors the horizontal level change of the input image and judges whether the edge portion is involved or not. The signal selection circuit 13, alternately outputs the output signals of the horizontal interpolation filter 10 and the horizontal phase shift circuit 11, based on the output from the horizontal edge detection circuit 12. The signal selection circuit 13 corresponds to a first signal selection circuit.

Figure 2:
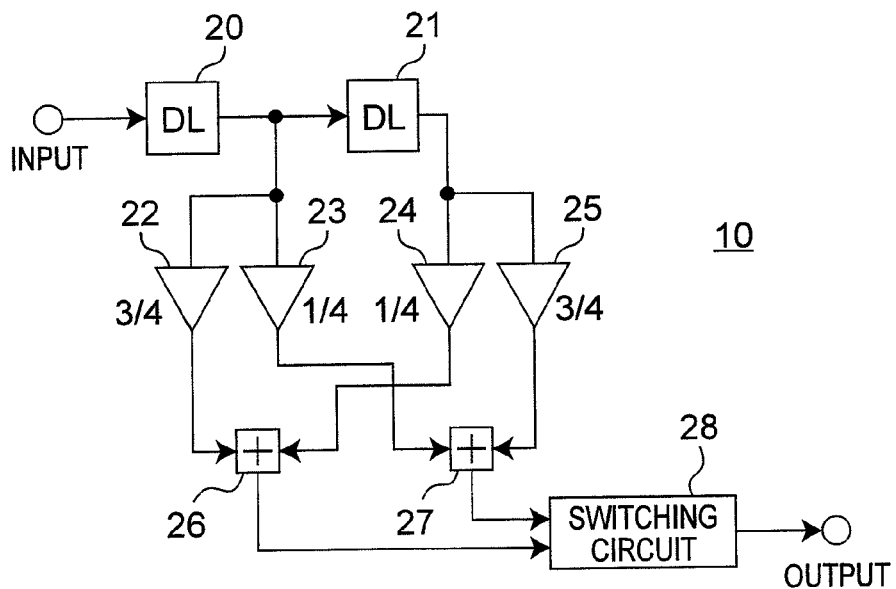
FIG. 2 is a block diagram showing a horizontal interpolation filter according to the first embodiment.

FIG. 2 is a block diagram showing a specific configuration of the horizontal interpolation filter 10. The horizontal interpolation filter 10 includes delay circuits 20 and 21, coefficient circuits 22, 23, 24 and 25, adders 26 and 27 and a switching circuit 28. An image signal input to the horizontal interpolation filter 10 is input to the delay circuit 20. The output of the delay circuit 20 is input to the delay circuit 21. The signals input to the delay circuits 20 and 21 are delayed by a sampling period respectively. Each of the delay circuits 20 and 21, is composed of a memory for storing the value of one pixel. The delay circuit 21, the coefficient circuits 23 and 25 and the add circuit 27 compose a two-tap digital filter. The coefficient circuit 23 uses a coefficient ¼, and the coefficient circuit 25 uses a coefficient ¾, which are multiplied by the outputs of the delay circuits 20 and 21, respectively. These results are added by the add circuit 27, so that the value of ¼ phase between the input two pixels is output. On the other hand, the delay circuit 21, the coefficient circuits 22 and 24 and the add circuit 26 also compose a two-tap digital filter. The coefficient circuit 22 uses a coefficient ¾, and the coefficient circuit 24 uses a coefficient ¼, which are multiplied by the outputs of the delay circuits 20, 21, respectively. These results are added by the add circuit 26, so that the value at ¾ phase between the two input pixels is output. The switching circuit 28 switches the input signals from the add circuits 27 and 26 applies, time-division multiplexing to the ¼ phase value and the ¾ phase value during one sampling period of the input image to the horizontal interpolation filter 10, i.e. during 37.0 ns, and output the result of the time-division multiplexing as an image signal which changes at intervals of 18.5 ns. With this configuration, the horizontal interpolation filter 10 interpolates and outputs the pixel values at timings corresponding to ¼ phase, i.e. about 9.3 ns and ¾ phase, i.e. about 27.8 ns after the timing of sampling the first one of the two successive input pixels.

Figure 3A:
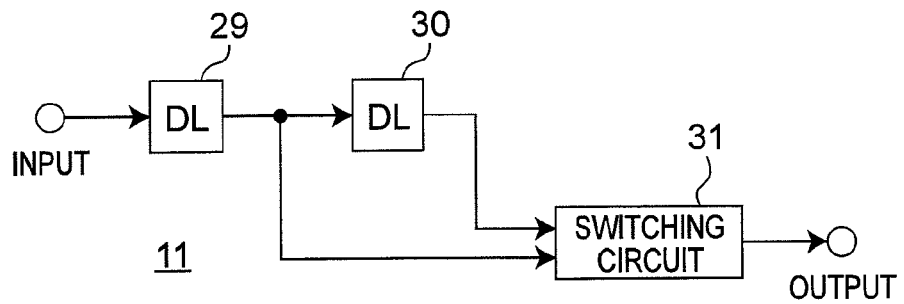
FIG. 3A is a block diagram showing a horizontal phase shift circuit according to the first embodiment.
Figure 3B:
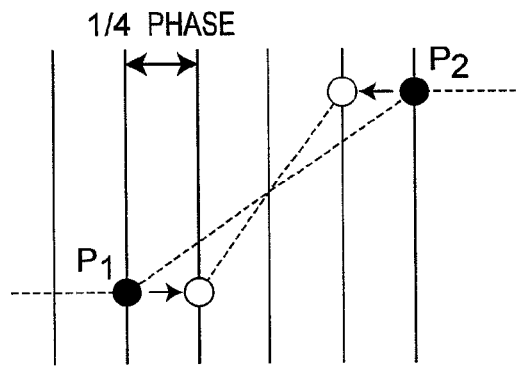
FIG. 3B is a diagram for explaining the phase shift by the horizontal phase shift circuit according to the first embodiment.

FIG. 3A is a block diagram showing the configuration of the horizontal phase shift circuit 11. The horizontal phase shift circuit 11 includes delay circuits 29 and 30 and a switching circuit 31. The input image signal is input to the delay circuit 29, and the output of the delay circuit 29 is input to the delay circuit 30, and is delayed by a sampling period. Each of the delay circuits 29 and 30, like the delay circuits 20 and 21, is composed of a memory for storing one pixel value. In the switching circuit 31, the signals output from the delay circuits 29 and 30 are output switched at intervals of a half of the sampling period of the image signal input to the horizontal phase shift circuit 11, i.e. 18.5 ns. As a result, the signal level of the original pixel input to the horizontal phase shift circuit 11 is kept at the same value, while only the temporal position (phase) is moved. Specifically, the horizontal phase shift circuit 11 outputs the pixel value of the first pixel at ¼ phase, i.e. about 9.3 ns and the pixel value of the second pixel at ¾ phase, i.e. about 27.8 ns after the sampling timing of the first one of the two successive input pixels. As a result, as shown in FIG. 3B, the first pixel P1 is output at a timing shifted ¼ phase (¼ sampling period) later from the sampling timing thereof. The second pixel P2 is output at a timing shifted ¼ phase ahead of the sampling timing thereof. In this case, the interval between the two pixels is narrowed, and therefore the gradient of signal level change of the pixels is increased. By using this shift, therefore, a clearer edge of the image is obtained.

Figure 4:
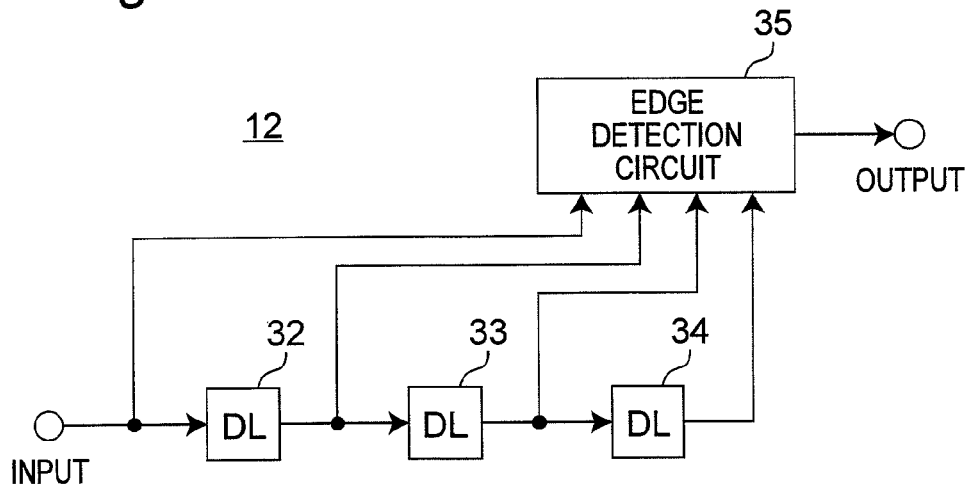
FIG. 4 is a block diagram showing a horizontal edge detection circuit according to the first embodiment.

FIG. 4 is a block diagram showing the configuration of the horizontal edge detection circuit 12. The horizontal edge detection circuit 12 includes delay circuits 32, 33 and 34 and an edge detection circuit 35. The input image signal is input to the delay circuit 32, and the output of the delay circuit 32 is input to the delay circuit 33. Further, the output of the delay circuit 33 is input to the delay circuit 34. Each of these delay circuits outputs a signal delayed by the sampling period behind the input pixel value thereof. Each of the delay circuits 32, 33 and 34, like the delay circuits 20 and 21, is composed of a memory for storing the pixel value of one pixel. The input and output of the delay circuit 32 and the outputs of the delay circuits 33 and 34, i.e. the pixel values of the four successive input images are input to the edge detection circuit 35. The edge detection circuit 35 judges that there exists a edge crossing these four pixels and outputs a value "1" when the signal level difference between the first and second pixels of the four successive input pixel values is small, the signal level difference between the third and fourth pixels is small and that the signal level difference between the second and third pixels is large. Otherwise, the edge detection circuit 35 judges that there exists no edge and outputs a value "0". This edge detection signal is output at time intervals of one sampling period in synchronism with the timing at which the ¼ phase signal is output from the horizontal interpolation filter 10 and the horizontal phase shift circuit 11. In this edge judgment, for example, the signal level difference between the first and second pixels is set to not more than 1% of the maximum amplitude, the signal level difference between the third and fourth pixels is set to not more than 1% of the maximum amplitude, and the signal level difference between the second and third pixels is set to not less than 10% of the maximum amplitude. By so setting, the portion at which the signal level suddenly changes can be detected as an edge. Although an example is described above in which the edge is detected using a total of four pixels including two pixels for generating the pixel values at the positions of ¼ phase and ¾ phase and two adjacent pixels before and after them, any other method may alternatively be used to detect whether the two pixels for generating the pixel values at the positions of ¼ phase and ¾ phase correspond to the edge portion or not.

The outputs of the horizontal interpolation filter 10, the horizontal phase shift circuit 11, and the horizontal edge detection circuit 12 are input to the signal selection circuit 13. The signal selection circuit 13 selects the output of the horizontal phase shift circuit 11 when the output of the horizontal edge detection circuit 12 is "1", i.e. the edge is detected, and selectively outputs the output of the horizontal interpolation filter 10 externally when the output of the horizontal edge detection circuit 12 is "0", i.e. the edge is not detected.

The signal processing apparatus according to this embodiment having the aforementioned configuration can move only the phase position to the positions of ¼ phase and ¾ phase between the two original pixels while keeping the current signal level at the edge portion of the input image, and at other than the edge portion, the signal levels at positions of ¼ phase and ¾ phase between the two original pixels can be calculated and output by the interpolation filter.

2. Operation

Next, the operation and the advantage of the signal processing apparatus according to the first embodiment is described in each of the cases where an original input signal waveform is a part of a sinusoidal waveform and a step waveform.

Figure 5:
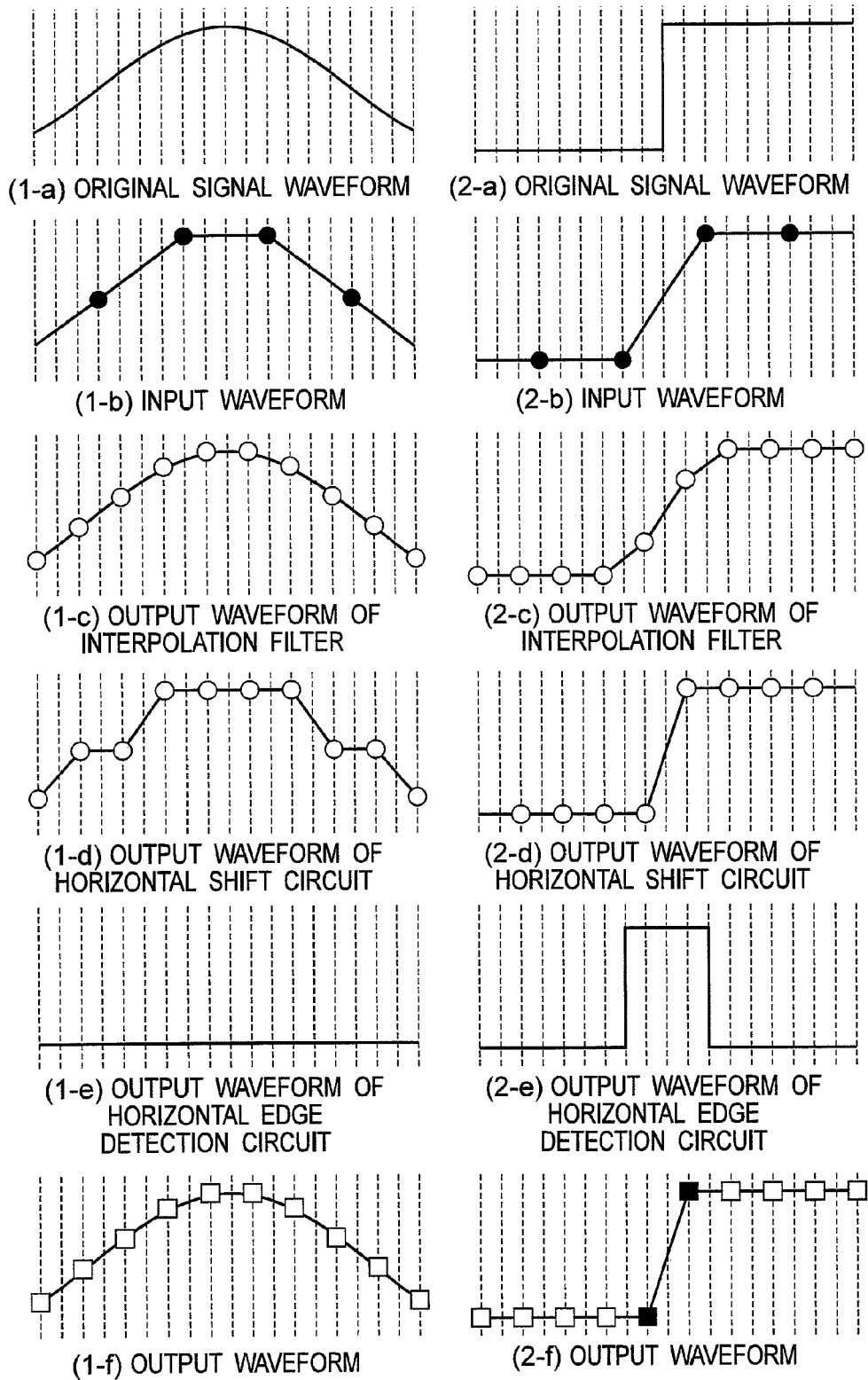
FIG. 5 is a waveform diagram of the signal processing apparatus according to the first embodiment.

FIG. 5 is a diagram showing an example of a waveform at each part of the signal processing apparatus according to this embodiment. In FIG. 5, the abscissa represents the horizontal position of the input image, and each interval of the dashed lines corresponds to ¼ of the pixel. The ordinate represents the signal level of the pixel which is normalized in the range of 0 to 1.

First, a description is given to a case in which the original signal waveform is a part of a sinusoidal waveform as shown in FIG. 5(1-a). The input waveform to the signal processing apparatus is obtained by sampling the original signal waveform and as shown in FIG. 5(1-b). In the following description, the two pixels in the neighborhood of the central apex of the waveform shown in FIG. 5(1-*b*) are assumed to be the pixels to be interpolated. Also, it is assumed that the signal levels, along the direction of amplitude, of the four original pixels in the neighborhood of the apex related to the interpolation have the values (0.5, 1, 1, 0.5).

The output of the horizontal interpolation filter 10 has the waveform shown in FIG. 5(1-*c*) as the result of computation in the two-tap filter having the coefficients (¾, ¼) and the two-tap filter having the coefficients (¼, ¾).

At the timing ¼ phase later than the sample timing of the first one of the two successive input pixels, the pixel value of the first pixel is output, while the pixel value of the second pixel is output at the timing ¾ phase later. As a result, the output of the horizontal phase shift circuit 11 has the waveform shown in FIG. 5(1-*d*).

On the other hand, the four successive pixel data (0.5, 1, 1, 0.5), fail to meet the criterion of the edge described above, and therefore, as shown in FIG. 5(1-*e*), the horizontal edge detection circuit 12 outputs "0". As a result, the signal selection circuit 13 selectively outputs the output of the horizontal interpolation filter 10. The final output has the waveform as shown in FIG. 5(1-*f*).

Next, a description is given to a case in which the original signal waveform is step-shaped as shown in FIG. 5(2-*a*). The input waveform to the signal processing apparatus has a waveform as shown in FIG. 5(2-*b*) obtained by sampling the step waveform. It is assumed that the two pixels at the central rise portion of the waveform shown in FIG. 5(2-*b*) are to be interpolated. The four original pixels related to this interpolation process have the signal level values (0, 0, 1, 1).

The output of the horizontal interpolation filter 10, which is computed by the two-tap filter having the coefficients (¾, ¼) and the two-tap filter having the coefficients (¼, ¾), has the waveform shown in FIG. 5(2-*c*).

At the timing ¼ phase later than the sample timing of the first one of the two successive input pixels, the pixel value of the first pixel is output, while the pixel value of the second pixel is output at the timing ¾ phase later. As a result, the output of the horizontal phase shift circuit 11 has the waveform shown in FIG. 5(2-*d*).

On the other hand, the four successive pixel data (0, 0, 1, 1) meet the criterion of the edge described above, and therefore, the horizontal edge detection circuit 12 outputs "1". Specifically, the output of the horizontal edge detection circuit 12, as shown in FIG. 5(2-*e*), has a waveform of the value "1" only at the timing when the edge is detected. The signal selection circuit 13 selects the output of the interpolation filter 10 when the output of the horizontal edge detection circuit 12 is "0", and the output of the horizontal phase shift circuit 11 when the output of the horizontal edge detection circuit 12 is "1". As a result, the last output has the waveform as shown in FIG. 5(2-*f*). In FIG. 5(2-*f*), the black squares are plotted to show the central rise portion of the phase of the original pixels, i.e. to show only the shift toward the edge portion. Therefore, the values thereof are "0" and "1" like the signal level of the input waveform.

Here, the degree to which the output waveform is steepened in the case where the aforementioned step waveform is input to the signal processing apparatus according to this embodiment is considered. In the input waveform shown in FIG. 5(2-*b*), the level of the rise portion increases from "0" to "1" during one sampling period of the input image. On the other hand, in the output waveform shown in FIG. 5(2-*d*), the level of the rise portion increases by "1" during a half of the time, i.e. a half of the sampling period. In other words, the gradient is doubled as compared with the input waveform shown in FIG. 5(2-*b*). A falling waveform, if input, can be similarly steepened. In this way, the signal processing apparatus according to this embodiment can double the absolute value of the gradient of the input waveform at the portion where it changes.

3. Summarization

As described above, in the signal processing apparatus according to the first embodiment, the absolute value of the gradient of change at the edge portion of the image can be doubled by the horizontal phase shift circuit 11 which moves the two input original pixels to the positions of ¼ phase and ¾ phase, respectively. Also, the gradient of change is steepened only by shifting phase without using the high-pass filter for enhancing the edge portion, and therefore, the waveform distortion which otherwise might be caused by an overshoot is prevented. As a result, a high-performance signal processing apparatus for doubling the number of pixels in the horizontal direction is realized.

In this case, the center of the change can be kept at the same position by moving the two original pixels to the positions of the ¼ phase and the ¾ phase, i.e. by ¼ phase to the direction to get closer each other. Once the central position of the change is displaced, a jaggy pattern is liable to occur in the image, this phenomenon can be prevented in this embodiment.

According to this embodiment, the delay circuits 20 and 21 of the horizontal interpolation filter 10, the delay circuits 29 and 30 of the horizontal phase shift circuit 11 and the delay circuits 32, 33 and 34 of the horizontal edge detection circuit 12 are arranged separately from each other. Alternatively, the signal processing apparatus may be configured by sharing these delay circuits.

Figure 6:
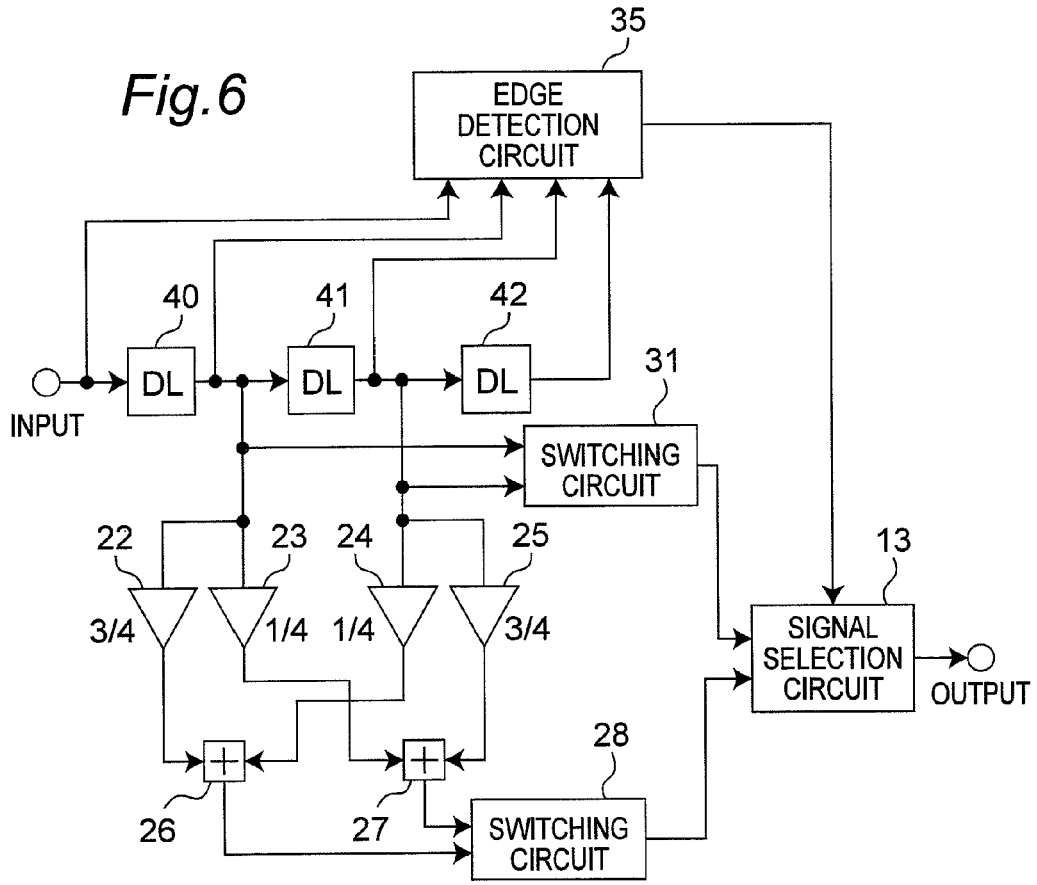
FIG. 6 is a block diagram of the signal processing apparatus having a common delay circuit shared by delay circuits of the first embodiment.

FIG. 6 shows the configuration of the signal processing apparatus sharing the delay circuits. In FIG. 6, the delay circuits 20, 29 and 32 are combined into a common delay circuit 40, and the delay circuits 21, 30 and 33 are combined into a common delay circuit 41. Also, a delay circuit 42 corresponds to the delay circuit 34. The remaining component parts are exactly the same as those of the signal processing apparatus shown in FIG. 1, and therefore, designated by the same reference numerals, respectively. The operation and advantages of the resulting signal processing apparatus are also similar to those of the signal processing apparatus shown in FIG. 1, and not described in detail.

It is noted that JP-A-6-178158 discloses a technique to obtain a clearer edge line of the input video signal, in which the sample value at the rise portion of the input step waveform is increased or decreased according to a predetermined rule to increase the gradient of the rise portion. This technique, however, fails to indicate the manner in which the number of pixels is increased. According to the present embodiment, for example, the number of pixels is increased by generating the interpolation pixels at the positions of ¼ phase and ¾ phase between two successive pixels, while moving the pixels from the initial positions thereof to increase the gradient. This concept is not disclosed in JP-A-6-178158.

Second Embodiment

Figure 7:
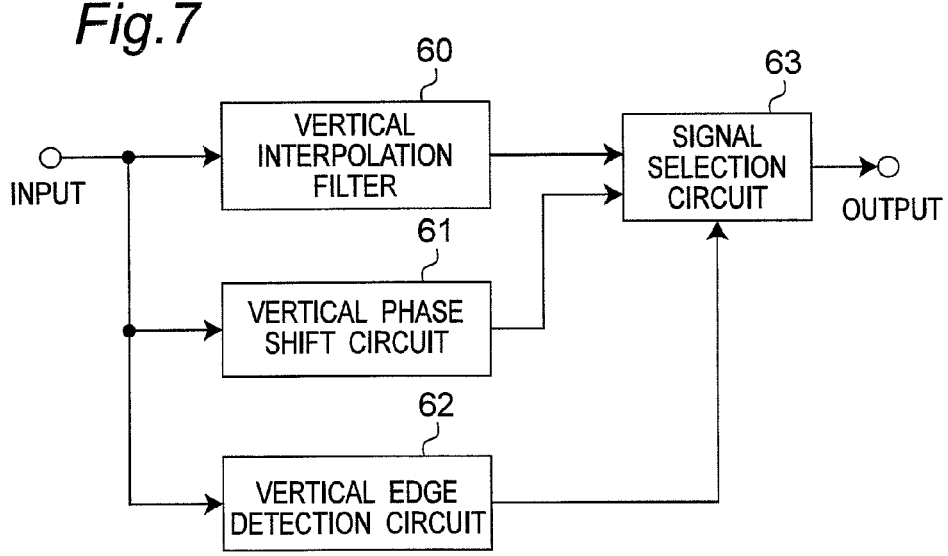
FIG. 7 is a block diagram showing a signal processing apparatus according to a second embodiment.

FIG. 7 is a block diagram showing the configuration of the signal processing apparatus according to a second embodiment. The description of the first embodiment describes the signal processing apparatus which doubles the number of pixels of the input image in the horizontal direction. On the other hand, in the signal processing apparatus according to the second embodiment doubles the number of pixels of the input image in a vertical direction. The basic concept of this embodiment is similar to that of the first embodiment.

Like in the first embodiment, the pixel value of each of pixels composing the image to be converted is input from the input terminal in the order of raster scan at a predetermined sampling period. As in the first embodiment, it is assumed that the input image having a total of 858 pixels (720 effective pixels) in the horizontal direction and a total of 525 lines (480 effective lines) in the vertical direction is progressively scanned by an image signal at a vertical frequency of 60 Hz with the sampling period is 37.0 ns.

The vertical interpolation filter 60 calculates and outputs by filtering the interpolation values at the positions of ¼ phase and ¾ phase between two vertically successive pixels of the input image. The vertical phase shift circuit 61 shifts the phases of the two vertically successive pixels of the input image in the vertical direction, and outputs by moving the two pixels to the positions of ¼ phase and ¾ phase between the two pixels (i.e., in the vertical direction). The vertical edge detection circuit 62 monitors the level change of the four vertically successive pixels of the input image, and judges whether the edge portion is involved or not. The signal selection circuit 63 switches the signal, and outputs by rearranging the pixel signals in the order of raster scan. The signal selection circuit 63 corresponds to a second signal selection circuit.

The signal processing apparatus according to the second embodiment shown in FIG. 7 is different in the following points from the signal processing apparatus according to the first embodiment shown in FIG. 1.

The horizontal interpolation filter 10 uses the delay circuits 20 and 21 for delaying the input image by one sampling period. On the other hand, in the vertical interpolation filter 60, these delay circuits are replaced a delay circuit for delaying the input image by the time equivalent to one line. One line of delay is specifically 37.0 ns×858≅31.7 μs.

The horizontal phase shift circuit 11 uses the delay circuits 29 and 30 for delaying the input image by one sampling period. On the other hand, in the vertical phase shift circuit 61, each of these delay circuits is a delay circuit for delaying the input image by the time equivalent to one line.

The horizontal edge detection circuit 12 uses the delay circuits 32, 33 and 34 for delaying the input image by one sampling period. On the other hand, in the vertical edge detection circuit 62, each of these delay circuits is a delay circuit for delaying the input image by the time equivalent to one line.

The signal selection circuit 13 simply selects and outputs the input signal. On the other hand, the input signal to the signal selection circuit 63, alternates, by time division, between the signals of ¼ phase line and ¾ line during the time of 37.0 ns. In the signal selection circuit 63, therefore, the signals of ¼ phase line and ¾ phase line are written in different line buffers after selection of the input signal and read out in the order of raster scan.

The operation of the signal processing apparatus according to the second embodiment configured as described above is described in more detail.

First, the vertical interpolation filter 60 has a delay circuit for delaying the input image by one line and makes the calculation for two vertically successive pixels. The vertical interpolation filter 60 has a vertical two-tap filter and calculates the interpolation values of ¼ phase and ¾ phase of two vertically adjacent pixels of the input image signal. In calculating the interpolation value of ¼ phase for one of the two vertically adjacent pixels of the input image, the signal level of the upper one of the two pixels is multiplied by the coefficient ¾, while the signal level of the lower pixel is multiplied by the coefficient ¼, and both products are added. On the other hand, in calculating the interpolation value of ⁄3;4 phase, the signal level of the upper one of the two original pixels is multiplied by the coefficient ¼, while the signal level of the lower pixel is multiplied by the coefficient ¾, and both products are added. As the result of adding both products, the ¼ phase line signal and the ¾ phase line signal are alternately output by the switch operation during the sampling period of the input image, i.e. during the time of 37.0 ns. The output of the vertical interpolation filter 60 changes the output line at intervals of 18.5 ns.

The vertical phase shift circuit 61, like the vertical interpolation filter 60, has a delay circuit for delaying the input image by one line. The vertical interpolation filter 60 outputs the pixel signal of the upper one of the two vertically adjacent pixels at the timing of outputting the ¼ phase signal of the two vertically adjacent pixels. Also, the vertical phase shift circuit 61 outputs the pixel signal of the lower one of the two vertically adjacent pixels at the same timing as when the vertical interpolation filter 60 outputs the ¾ phase signal of the two vertically adjacent pixels.

The vertical edge detection circuit 62 monitors the four vertically successive pixels using the three types of the delay circuits for delaying the input image by one line. Among four pixel data, it is assumed that the signal level difference between the first and second pixels is small, the signal level difference between the third and fourth pixels is small, and the signal level difference between the second and third pixels is large. Then, the vertical edge detection circuit 62 judges that there exists a edge crossing the four pixels and outputs the value "1". Otherwise, the vertical edge detection circuit 62 judges there exists no edge and outputs the value "0". This edge detection signal is output at every sampling period in synchronism with the timing at which the ¼ phase signal is output from the vertical interpolation filter 60 and the vertical phase shift circuit 61 for each sampling period, i.e. at intervals of 37.0 ns. In this edge judgment, for example, the signal level difference between the first and second pixels is set to not more than 1% of the maximum amplitude, the signal level difference between the third and fourth pixels is set to not more than 1% of the maximum amplitude, and the signal level difference between the second and third pixels is set to not less than 10% of the maximum amplitude. By this setting, the portion where the signal level suddenly changes can be detected as a edge.

The outputs of the vertical interpolation filter 60, the vertical phase shift circuit 61 and the vertical edge detection circuit 62 described above are input to the signal selection circuit 63. The signal selection circuit 63 selects the output of the vertical phase shift circuit 61 when the output of the vertical edge detection circuit 62 is "1", i.e. when the edge is detected, and selects the output of the vertical interpolation filter 60 when the output of the vertical edge detection circuit 62 is "0", i.e. when no edge is detected. The signals thus selected are alternately switched between the ¼ phase line signal and the ¾ phase line signal for each pixel, and therefore, not arranged in the order of raster scan. Therefore, these signals are written alternately in the ¼ phase line buffer and the ¾ phase line buffer, read in the order of raster scan, and output to the exterior.

As described above, in the signal processing apparatus according to the second embodiment, only the phase is moved to the positions of ¼ phase and ¾ phase between the two original pixels while keeping the current signal level at the edge portion of the input image. At other than the edge portion, on the other hand, the signal levels at the positions of ¼ phase and ¾ phase between the two original pixels are calculated and output by the filter. As a result, for the same reason as in the first embodiment, the absolute value of the gradient of change at the edge portion can be doubled. Also, the gradient of change at the edge portion is steepened only by moving the phase without using the high-pass filter for enhancing the edge portion, and therefore, the waveform distortion which otherwise might be caused by the overshoot is prevented. Thus, a high-performance signal processing apparatus for doubling the number of pixels in the vertical direction can be realized.

It is noted that according to this embodiment, like in the first embodiment, the delay circuits can be combined into a common delay circuit.

Third Embodiment

Figure 8:
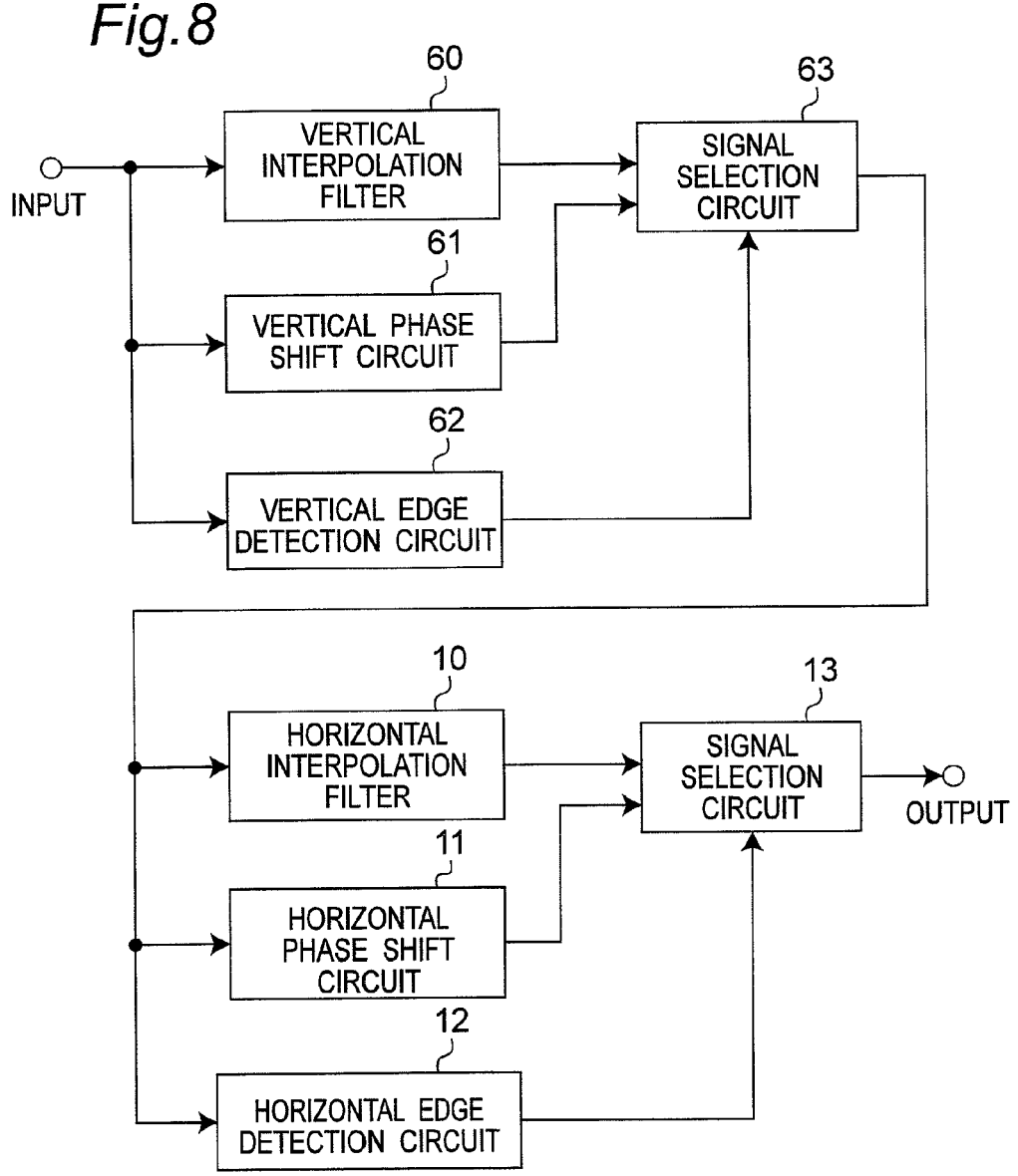
FIG. 8 is a block diagram showing a signal processing apparatus according to a third embodiment.

FIG. 8 is a block diagram showing a configuration of a signal processing apparatus according to a third embodiment. The signal processing apparatus according to this embodiment is a serial combination of the signal processing apparatus according to the second embodiment shown in FIG. 7 and the signal processing apparatus according to the first embodiment shown in FIG. 1. In FIG. 8, the same component elements as those of the first and second embodiments are designated by the same reference numerals, respectively, and not described in detail.

In the signal processing apparatus according to the third embodiment configured as described above, the vertical interpolation filter 60, the vertical phase shift circuit 61, the vertical edge detection circuit 62 and the signal selection circuit 63 generate image signals of ¼ phase and ¾ phase between two vertically adjacent original pixels of the input image signal, and double the number of pixels in the vertical direction. As described in the second embodiment, the absolute value of the gradient of change at the edge portion is increased to a double. Next, the output signal of the signal selection circuit 63 is input to the horizontal interpolation filter 10, the horizontal phase shift circuit 11 and the horizontal edge detection circuit 12. The sampling period of the image signal input to these circuits is a half of the sampling period of the image input to the signal processing apparatus according to this embodiment. This is because the total number of pixels of the image signal is doubled by the first half circuits. The horizontal interpolation filter 10, the horizontal phase shift circuit 11, the horizontal edge detection circuit 12 and the signal selection circuit 13 generate the image signals of ¼ phase and ¾ phase between the two horizontally successive original pixels, thereby doubling the number of pixels in the horizontal direction. In this case, as described in the first embodiment, the absolute value of the gradient of change is doubled at the edge portion. In other words, the signal processing apparatus according to the third embodiment increases the number of pixels to a double both in the vertical and horizontal directions for a total of fourfold pixels.

In this way, the signal processing apparatus according to the third embodiment can achieve a steep waveform by doubling the absolute values of the gradient of change at the edge portion in both the horizontal and vertical directions. Also, a high-performance signal processing apparatus free of a waveform distortion due to the overshoot is realized.

It is noted that unlike in the third embodiment in which the signal is processed horizontally after vertically, on the other hand the signal may be processed vertically after horizontally, it causes equal effect.

Fourth Embodiment

Figure 9:
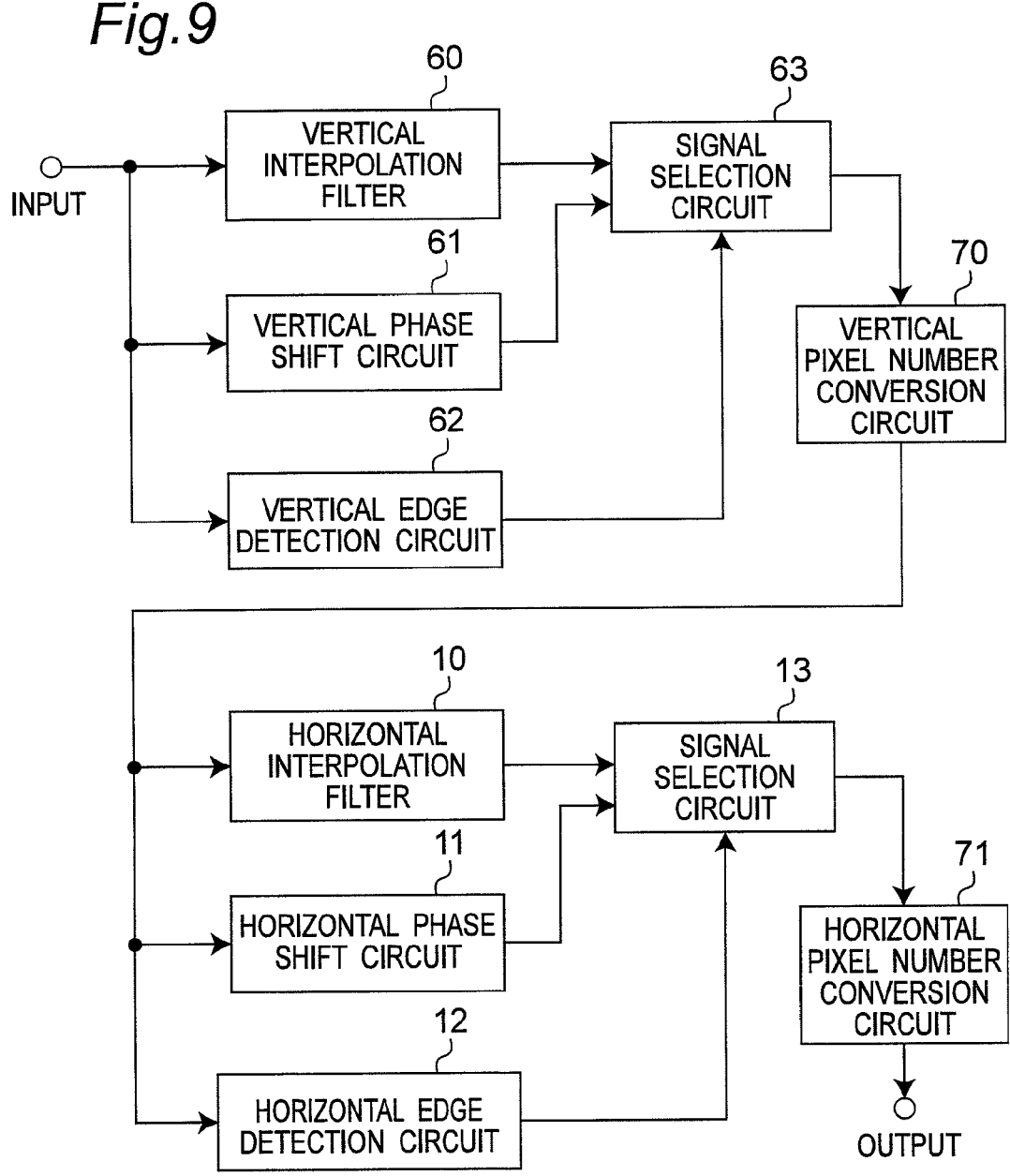
FIG. 9 is a block diagram showing a signal processing apparatus according to a fourth embodiment.

FIG. 9 is a block diagram showing a configuration of a signal processing apparatus according to a fourth embodiment. The signal processing apparatus according to this embodiment has a configuration in which a vertical pixel number conversion circuit 70 and a horizontal pixel number conversion circuit 71 are added to the signal processing apparatus according to the third embodiment shown in FIG. 8. The same component elements as those of the aforementioned embodiments are designated by the same reference numerals, respectively, and not described in detail.

In FIG. 9, the vertical pixel number conversion circuit 70 converts the number of lines from 960 to 1080 in a vertical direction, and the horizontal pixel number conversion circuit 71 converts the number of pixels from 1440 to 1920 in a horizontal direction.

The operation of the signal processing apparatus according to the fourth embodiment configured as described above is described below.

First, an image signal progressively scanned on 720 effective pixels in the horizontal direction and 480 effective lines in the vertical direction is input from an input terminal. This image signal is converted into an image signal having double pixels, i.e. 960 effective lines in the vertical direction by the vertical interpolation filter 60, the vertical phase shift circuit 61, the vertical edge detection circuit 62 and the signal selection circuit 63. Next, the image signal having 960 effective lines in the vertical direction is converted to an image signal having 1080 effective lines in the vertical direction by the vertical pixel number conversion circuit 70. The vertical pixel number conversion circuit 70 limits the frequency band of the image signal to the same frequency band as the Nyquist frequency of the image signal having 960 effective pixels using a digital filter, and calculates the interpolation data to form 9/8 times as many pixels.

Next, the image signal output from the vertical pixel number conversion circuit 70 is converted into an image signal having 1440 instead of 720 horizontal effective pixels by the horizontal interpolation filter 10, the horizontal phase shift circuit 11, the horizontal edge detection circuit 12 and the signal selection circuit 13. Next, the image signal having 1440 horizontal effective pixels is converted to an image signal having 1920 horizontal effective pixels by the horizontal pixel number conversion circuit 71. Specifically, the horizontal pixel number conversion circuit 71 limits the frequency band of the image signal to the same frequency band as the Nyquist frequency of the image signal having 1440 effective horizontal pixels using a digital filter, and calculates the interpolation data to form 4/3 times as many pixels.

As described above, in the signal processing apparatus according to the fourth embodiment, the number of effective pixels in the horizontal direction can be converted from 720 to 1920, and the number of effective lines in the vertical direction can be converted from 480 to 1080. Also, in this signal processing apparatus, the image signal is filtered by each pixel number conversion circuit after doubling the absolute value of the gradient of change at the edge portion in both the horizontal and vertical directions, i.e. after widening the signal frequency band. Therefore, the signal frequency band to be limited can be set widely. In other words, a signal processing apparatus in which can change the number of pixels while at the same time maintaining the steep change of the gradient at the edge portion is realized.

Although the signal processing apparatus according to the fourth embodiment is configured so that the vertical pixel number conversion circuit 70 changes the number of effective lines in the vertical direction from 960 to 1080, the number of effective lines may alternatively be changed to another integer such as 1024. Similarly, instead of converting the number of horizontal effective pixels from 1440 to 1920, the horizontal pixel number conversion circuit 71 may change the number of horizontal effective pixels to another integer such as 2048.

Also, the signal processing apparatus according to the fourth embodiment is so configured that the output with the number of pixels doubled in the vertical direction is input to the vertical pixel number conversion circuit 70 in the same configuration as the second embodiment, and furthermore the output with the number of pixels in the output of the vertical pixel number conversion circuit 70 doubled in the horizontal direction is input to the horizontal pixel number conversion circuit 71 in the same configuration as the first embodiment. Nevertheless, the process of doubling the number of pixels with a configuration similar to the first or second embodiment and the process in each pixel number conversion circuit may be executed in reverse order. Alternatively, for example, the output with the number of pixels doubled in the vertical direction is input to the vertical pixel number conversion circuit 70, and the output of the vertical pixel number conversion circuit 70 is input to the horizontal pixel number conversion circuit 71, after which the number of pixels in the output of the horizontal pixel number conversion circuit 71 is doubled in the horizontal direction with equal effect.

Also, the conversion ratio of the vertical pixel number conversion circuit 70 and the horizontal pixel number are not limited to the above-described ratio.

Fifth Embodiment

Figure 10:
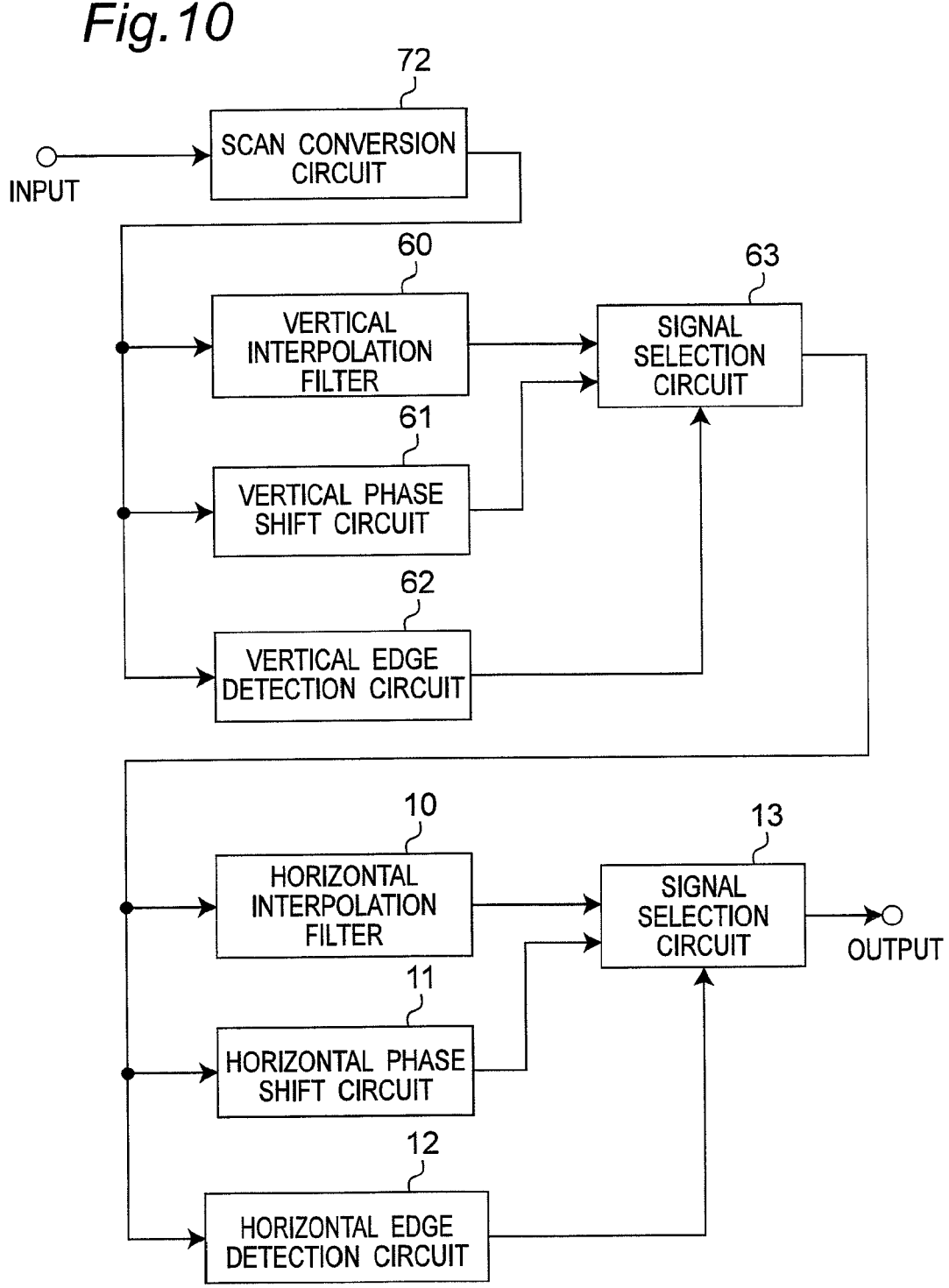
FIG. 10 is a block diagram showing a signal processing apparatus according to a fifth embodiment.

FIG. 10 is a block diagram showing a configuration of a signal processing apparatus according to a fifth embodiment. The signal processing apparatus according to this embodiment is configured so that a scan conversion circuit 72 is added to the signal processing apparatus according to the third embodiment (see FIG. 8). The same component elements as those of the aforementioned embodiments are designated by the same reference numerals, respectively, and not described in detail.

The scan conversion circuit 72 converts the image signal from the interlace scanning of 480 effective lines in the vertical direction and 720 effective pixels in the horizontal direction to the progressive scanning of 480 effective lines in the vertical direction and 720 effective pixels in the horizontal direction.

The operation of the signal processing apparatus according to the fifth embodiment having the aforementioned configuration is described below.

First, an image signal for interlace scanning of 720 effective pixels in the horizontal direction and 480 effective lines in the vertical direction is input from an input terminal. This image signal is converted to an image signal for progressive scanning of 480 effective lines in the vertical direction and 720 effective pixels in the horizontal direction by the scan conversion circuit 72. In the scan conversion circuit 72, the image of the field in process and the image of the immediately preceding field are alternately switched line by line with a field memory and thus converted to a progressively scanned image. The subsequent operation is identical with the corresponding operation in the third embodiment.

As described above, in the signal processing apparatus according to the fifth embodiment, the interlaced image having 720 effective pixels in the horizontal direction and 480 effective lines in the vertical direction can be converted into a progressive image having 1440 effective pixels in the horizontal direction and 960 effective lines in the vertical direction. Also, a signal processing apparatus having a steep change of gradient at the edge portion can be realized.

Sixth Embodiment

Figure 11:
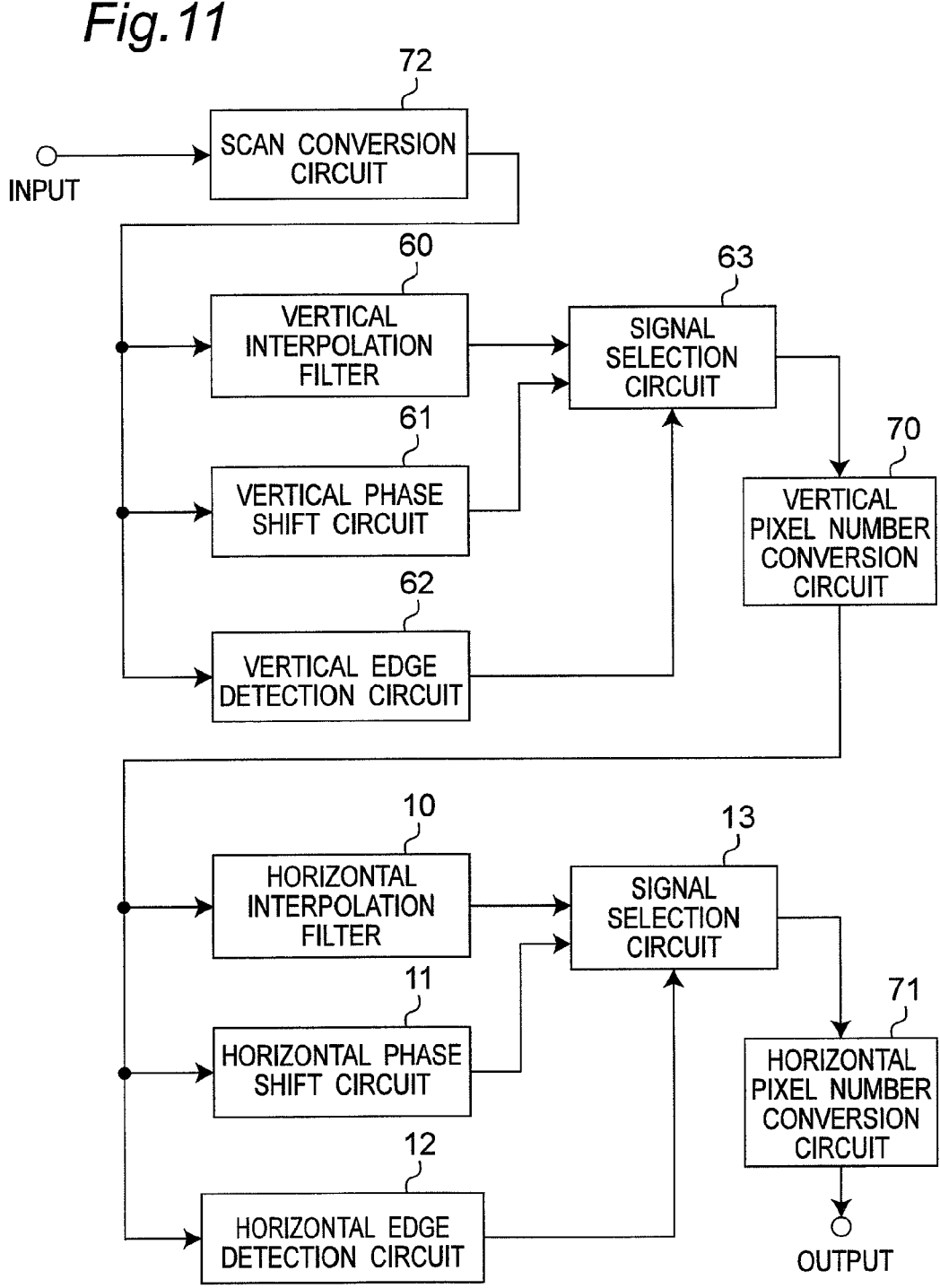
FIG. 11 is a block diagram showing a signal processing apparatus according to a sixth embodiment.

FIG. 11 is a block diagram showing a configuration of a signal processing apparatus according to a sixth embodiment. The signal processing apparatus according to this embodiment is configured so that the scan conversion circuit 72 is added to the signal processing apparatus according to the fourth embodiment (see FIG. 9). In FIG. 11, the same component elements as those in the aforementioned embodiments are designated by the same reference numerals, respectively, and not described in detail.

The scan conversion circuit 72 has the same configuration as the scan conversion circuit according to the fifth embodiment.

The operation of the signal processing apparatus according to the sixth embodiment configured as described above is described below.

First, an image signal for interlace scanning of 720 effective pixels in the horizontal direction and 480 effective lines in the vertical direction is input from an input terminal. This image signal is converted into an image signal for progressive scanning of 480 effective lines in the vertical direction and 720 effective pixels in the horizontal direction by the scan conversion circuit 72. The subsequent operation is identical with the corresponding one described with reference to the fourth embodiment.

As described above, in the signal processing apparatus according to the sixth embodiment, the image for interlace scanning of 720 effective pixels in the horizontal direction and 480 effective lines in the vertical direction can be converted to an image for progressive scanning of 1920 effective pixels in the horizontal direction and 1080 effective lines in the vertical direction. Also, a signal processing apparatus with a steep change of gradient at the edge portion can be realized.

Seventh Embodiment

The functions of the signal processing apparatuses according to the embodiments described above can be realized also by a computer (hardware) and a program (software). Such a signal processing program is described below. Each process is executed by a CPU according to the program stored in a memory. Also, the input image signal for one screen is stored in a memory connected with the CPU, and this CPU reads the pixel value of each pixel from this memory. Similarly, the data in the process of calculation and the finally output image signal are stored in a memory, and read from and written into by the CPU. Pixels are generated at ¼ and ¾ phase positions between two horizontally adjacent pixels of the input image thereby to generate an output image having twice as many pixels in the horizontal direction.

As an example of this embodiment, a description is given to a program for realizing the functions of the signal processing apparatus according to the first embodiment, i.e. a signal processing program for doubling the number of pixels of the input image in the horizontal direction.

Figure 12:
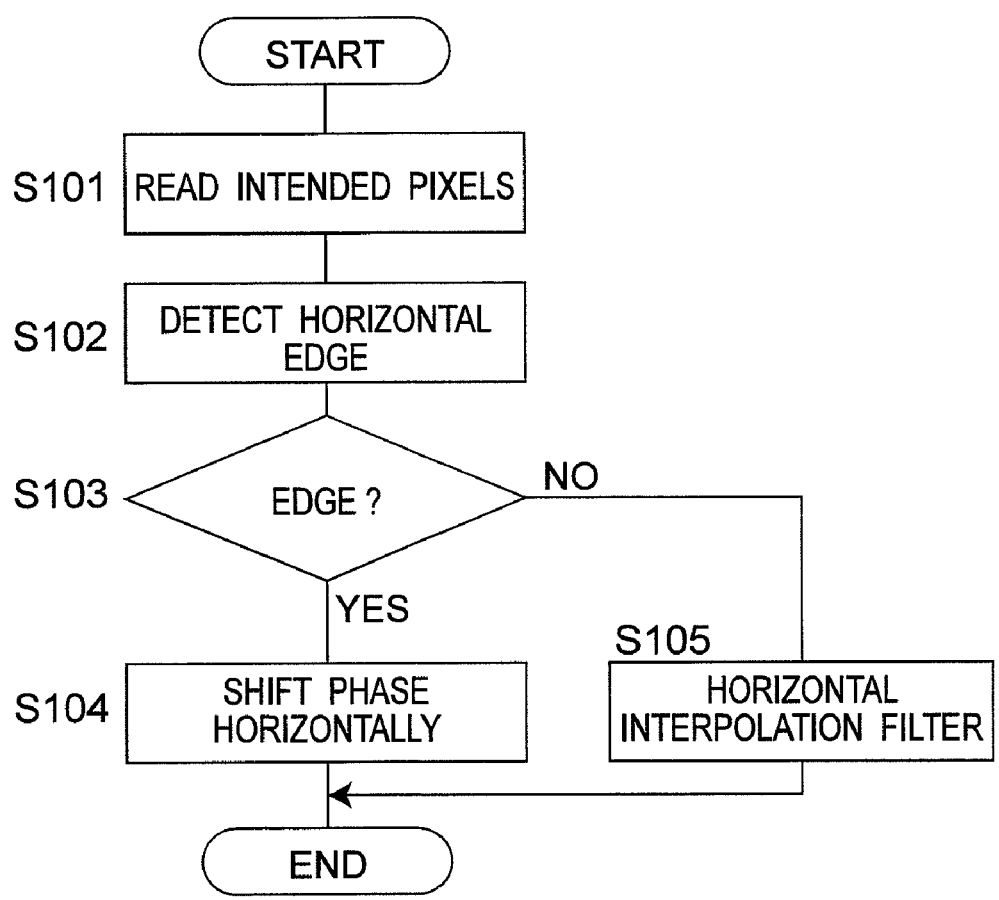
FIG. 12 is a flowchart of a signal processing program according to a seventh embodiment.
Figure 13:
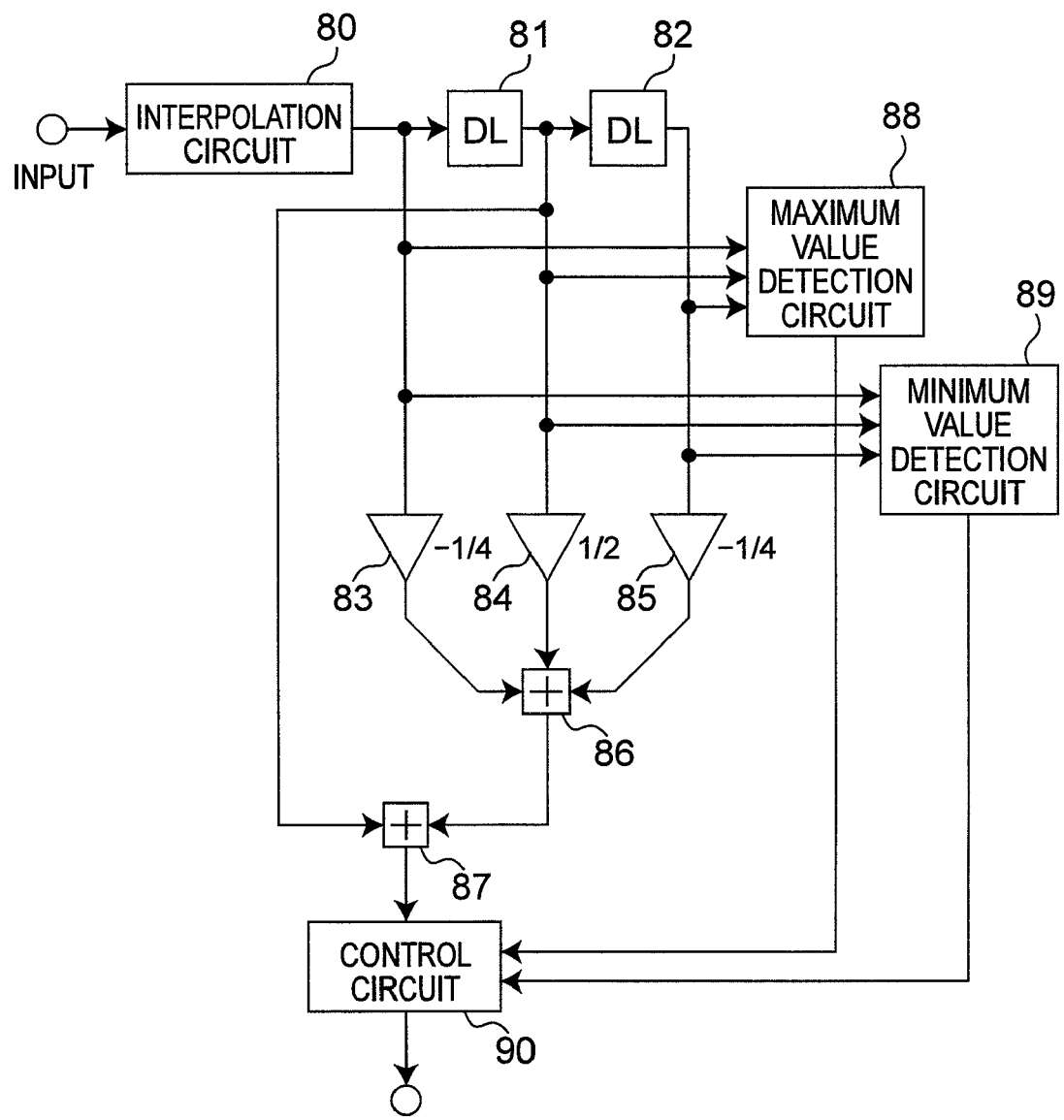
FIG. 13 is a block diagram showing the conventional signal processing apparatus.

FIG. 12 is a flowchart of a signal processing program according to a seventh embodiment. In this flowchart, four horizontally successive pixels of the input image are input, and the values for the pixels are calculated and output. The process for the whole screen can be realized by repeating the process of this flowchart plural times. The processing flow is described below with reference to this flowchart.

The CPU first reads four horizontally successive pixels intended to be processed from a memory (S101). It is assumed that the pixel values thus read are designated as X1, X2, X3 and X4 in that order from left.

The horizontal edge detection process monitors the level change of the four pixels and judges whether a edge portion is involved or not (S102). It is assumed that the existence of a edge portion is detected, for example, on condition that the difference between X1 and X2 is not more than 1% of the maximum amplitude A, the difference between X3 and X4 is not more than 1% of the maximum amplitude A and the difference between X2 and X3 is not less than 10% of the maximum amplitude A of the image signal. Then, the portion involved can be determined as a edge portion in the case where the equations below are satisfied.

$$|X1-X2| \leq 1/100 \times A, \text{ and}$$

$$|X3-X4| \leq 1/100 \times A, \text{ and}$$

$$|X2-X3| \geq 10/100 \times A$$

In accordance with the result of detection in the horizontal edge detection process, the method of calculating the output pixel is switched (S103). Specifically, upon detection that the portion involved is a edge portion, the pixel value of the output is determined by the horizontal phase shift process (S104). On the other hand, upon detection that the portion involved is not a edge portion, the pixel value of the output is determined by the horizontal interpolation filter process (S105).

The horizontal phase shift process (S104) outputs the pixel values of the two central ones of the four pixels, i.e. the pixels X2 and X3 as they are as phase shift values for ¼ phase and ¾ phase, respectively. Specifically, in the case where the pixel value of ¼ phase is Y1 and the pixel value of ¾ phase is Y2 as an output value, the following equations are obtained.

$$Y1 = X2$$

$$Y2 = X3$$

On the other hand, the horizontal interpolation filter process (S105) calculates and outputs by filtering the interpolation values of ¼ phase position and ¾ phase position of the pixels X2 and X3. Specifically, Y1 and Y2 are calculated from the following equations.

$$Y1 = 3/4 \times X2 + 1/4 \times X3$$

$$Y2 = 1/4 \times X2 + 3/4 \times X3$$

As described above, in the signal processing program according to the seventh embodiment shown in FIG. 12, the value is output with the signal level kept as it is at the edge portion of the input image and only the phase moved to the positions of ¼ phase and ¾ phase positions between two original pixels, while the signal levels at the positions of ¼ phase and ¾ phase between the two original pixels are calculated and output by the interpolation filter at other than the edge portion.

As described above, with the signal processing program according to the seventh embodiment, like in the signal processing apparatus according to the first embodiment, two input original pixels are moved directly to the positions of ¼ phase and ¾ phase at the edge portion of the image, so that the absolute value of the gradient of change at the edge portion can be doubled. Also, the change of the gradient is steepened only by moving the phase without using the high-pass filter for enhancing the edge portion, and therefore, the waveform distortion which otherwise might be caused by the overshoot is avoided. As a result, a high-performance signal processing apparatus for doubling the number of pixels in the horizontal direction can be realized.

An example of realizing the functions of the signal processing apparatus according to the first embodiment using a program is described above. Similarly, the functions of the signal processing apparatuses according to the second to sixth embodiments can of course be realized with a program.

INDUSTRIAL APPLICABILITY

The signal processing apparatus according to the embodiments can widen the signal frequency band by doubling the absolute value of the gradient of change at the edge portion in the case where a digital image signal is converted to a signal of higher definition on the one hand, and a high-quality image free of a waveform distortion which otherwise might be caused by the overshoot can be formed on the other hand. As a result, the signal processing apparatus according to the present invention is applicable very usefully to video display devices such as a plasma display and a liquid crystal display and imaging devices such as a digital camera.

The foregoing description deals with specified embodiments, to which the technical idea of above embodiments is not limited, and which can variously modified, corrected or otherwise utilized as apparent to those skilled in the art. These embodiments, therefore, are not limited to the specified disclosure therein, but may be limited only by the scope of claims attached hereto.

What is claimed is:

1. A signal processing apparatus for doubling the number of effective pixels of an input digital image in a predetermined direction, comprising:
   an interpolation filter for outputting an interpolation value of signal levels at positions of ¼ phase and ¾ phase between two original pixels of the input digital image adjacent in the predetermined direction;
   a phase shift circuit for outputting signal value of each of the two original pixels by shifting the phases of the signals of the two original pixels in the predetermined direction to ¼ phase and ¾ phase, respectively, between the two original pixels;
   an edge detection circuit for detecting an edge portion of the image from a signal level change of a plurality of pixels including the two original pixels of the input digital image in the predetermined direction; and
   a first signal selection circuit for outputting the output of the phase shift circuit when the edge is detected, and outputting the output of the interpolation filter when no edge is detected, based on the result of detection by the edge detection circuit.

2. The signal processing apparatus according to claim 1, further comprising:
   a pixel number conversion circuit for converting the number of pixels of the output image of the first signal selection circuit into the number of pixels in a predetermined direction, which is equal to the predetermined integral multiple of the number of pixels before converting ratio.

3. The signal processing apparatus according to claim 2, wherein the predetermined direction is a horizontal direction of the input digital image.

4. The signal processing apparatus according to claim 2, wherein the predetermined direction is a vertical direction of the input digital image.

5. The signal processing apparatus according to claim 1, further comprising:
a scan conversion circuit for converting an interlaced image signal into a progressive image signal,
wherein the progressive image signal output from the scan conversion circuit is used as the input digital image.

6. The signal processing apparatus according to claim 5, wherein the predetermined direction is a horizontal direction of the input digital image.

7. The signal processing apparatus according to claim 5, wherein the predetermined direction is a vertical direction of the input digital image.

8. The signal processing apparatus according to claim 1, wherein the predetermined direction is a horizontal direction of the input digital image.

9. The signal processing apparatus according to claim 1, wherein the predetermined direction is a vertical direction of the input digital image.

10. A signal processing apparatus for doubling the number of effective pixels of an input digital image in both the horizontal and vertical directions, comprising:
a horizontal interpolation filter for outputting an interpolation value of signal levels at positions of ¼ phase and ¾ phase between two original pixels adjacent in the horizontal direction of the input digital image;
a horizontal phase shift circuit for outputting a signal value of each of the two original pixels by shifting the horizontal phase of the signal of the two original pixels to ¼ phase and ¾ phase, respectively, between the two original pixels;
a horizontal edge detection circuit for detecting an edge portion of the image from a signal level change of a plurality of pixels including the two original pixels of the input digital image, in the horizontal direction;
a first signal selection circuit for outputting the output of the horizontal phase shift circuit when the edge is detected, and outputting the output of the horizontal interpolation filter when no edge is detected, based on the result of detection by the horizontal edge detection circuit;
a vertical interpolation filter for outputting an interpolation value of signal levels at the positions of ¼ phase and ¾ phase between two original pixels adjacent in the vertical direction of the input digital image;
a vertical phase shift circuit for outputting a signal value of each of the original pixels by shifting the vertical phase of the signals of the two original pixels to ¼ phase and ¾ phase between the two original pixels;
a vertical edge detection circuit for detecting an edge portion of the image based on a signal level change of a plurality of pixels including the two original pixels of the input digital image, in the vertical direction; and
a second signal selection circuit for outputting the output of the vertical phase shift circuit when the edge is detected, and outputting the output of the vertical interpolation filter when no edge is detected, based on the result of detection by the vertical edge detection circuit.

11. The signal processing apparatus according to claim 10, further comprising:
a horizontal pixel number conversion circuit for converting the number of pixels of the output image from the first signal selection circuit into the number of pixels in a predetermined integer ratio, in the horizontal direction; and
a vertical pixel number conversion circuit for converting the number of pixels of the output image from the second signal selection circuit into the number of pixels in a predetermined integer ratio, in the vertical direction.

12. The signal processing apparatus according to claim 10, further comprising:
a scan conversion circuit for converting an interlaced image signal into a progressive image signal,
wherein the progressive image signal output from the scan conversion circuit is used as the input digital image.

13. A signal processing method for doubling the number of effective pixels in a predetermined direction of an input digital image, comprising:
outputting an interpolation value of signal levels at the positions of ¼ phase and ¾ phase between two original pixels of the input digital image adjacent in a predetermined direction;
outputting signal value of each of the two original pixels by shifting the phases of the signals of the two original pixels in the predetermined direction to ¼ phase and ¾ phase, respectively, between the two original pixels;
detecting an edge portion of the image from a signal level change of a plurality of pixels including the two original pixels of the input digital image in the predetermined direction; and
outputting the outputted signal value when the edge is detected, and outputting the outputted interpolation value when no edge is detected, based on the result of detecting the edge portion.

14. A signal processing program for causing the computer to carry out a signal processing method according to claim 13.

* * * * *